US 12,221,727 B2

(12) United States Patent
Egawa et al.

(10) Patent No.: US 12,221,727 B2
(45) Date of Patent: Feb. 11, 2025

(54) MULTILAYER FABRIC FOR NONWOVEN FABRIC

(71) Applicant: NIPPON FILCON CO., LTD., Tokyo (JP)

(72) Inventors: Toru Egawa, Shizuoka (JP); Tsutomu Usuki, Shizuoka (JP); Keisuke Inoue, Shizuoka (JP)

(73) Assignee: NIPPON FILCON CO., LTD., Tokyo (JP)

( * ) Notice: Subject to any disclaimer, the term of this patent is extended or adjusted under 35 U.S.C. 154(b) by 866 days.

(21) Appl. No.: 17/358,949

(22) Filed: Jun. 25, 2021

(65) Prior Publication Data

US 2021/0324552 A1 Oct. 21, 2021

Related U.S. Application Data (63) Continuation of application No. PCT/JP2019/051157, filed on Dec. 26, 2019.

(30) Foreign Application Priority Data

Dec. 28, 2018 (JP) ................................. 2018-248129

(51) Int. Cl.
*D03D 11/00* (2006.01)
*B65G 15/30* (2006.01)
*D03D 1/00* (2006.01)

(52) U.S. Cl.
CPC ............ *D03D 11/00* (2013.01); *B65G 15/30* (2013.01); *D03D 1/0094* (2013.01)

(58) Field of Classification Search
CPC ...... D03D 15/533; D03D 15/58; D03D 15/54; D03D 13/00; D03D 13/004; D03D 13/018; D03D 11/00

(Continued)

(56) References Cited

U.S. PATENT DOCUMENTS 5,349,990 A 9/1994 Gacsay
2005/0103397 A1 5/2005 Quigley et al.
(Continued)

FOREIGN PATENT DOCUMENTS

CN 104781165 A 7/2015
EP 2 698 458 A1 2/2014
(Continued)

OTHER PUBLICATIONS

Office Action Issued in Chinese Application No. 201980085814.0, dated Apr. 28, 2023.
(Continued)

*Primary Examiner* — Camie S Thompson
(74) *Attorney, Agent, or Firm* — Michael Best & Friedrich LLP (57) ABSTRACT

In a multilayer fabric for nonwoven fabric 30, an upper-surface-side fabric formed from upper-surface-side warps (1Ub, 2U, 3U, 4U, 4U', 5Ub, 6U, 7U, 8U, 8U') and upper-surface-side wefts (1'U, 2'U, 3'U, 4'U) and a lower-surface-side fabric formed from lower-surface-side warps (1Lb, 2L, 3L, 5Lb, 6L, 7L) and lower-surface-side wefts (1'L, 2'L, 3'L, 4'L) are bound together. First warps (1Ub, 5Ub) of the upper-surface-side warps serve as first binding yarns that bind the upper-surface-side fabric and the lower-surface-side fabric, and second warps (1Lb, 5Lb) of the lower-surface-side warps serve as second binding yarns that bind the upper-surface-side fabric and the lower-surface-side fabric. A high-friction yarn is used as at least some of the upper-surface-side warps.

12 Claims, 9 Drawing Sheets (58) Field of Classification Search
USPC .............. 442/205, 206, 207; 139/408, 413; 428/257
See application file for complete search history.

(56) References Cited

U.S. PATENT DOCUMENTS

| | | |
|---|---|---|
| 2010/0252137 A1 | 10/2010 | Ueda |
| 2015/0203994 A1 | 7/2015 | Egawa et al. |
| 2018/0223903 A1 | 8/2018 | Zhang et al. |
| 2019/0024270 A1 | 1/2019 | Monnerie et al. |

FOREIGN PATENT DOCUMENTS

| | | |
|---|---|---|
| JP | 2006-512505 A | 4/2006 |
| JP | 2010-126848 A | 6/2010 |
| JP | 2018-071030 A | 5/2018 |
| WO | 2012-140992 A1 | 10/2012 |
| WO | 2012-140993 A1 | 10/2012 |
| WO | 2017-186512 A1 | 11/2017 |

OTHER PUBLICATIONS

Extended Search Report Issued in European Application No. 19905813.2, dated Jan. 4, 2022.
International Search Report Issued in Application No. PCT/JP2019/051157, dated Mar. 24, 2020.
International Preliminary Report on Patenability Issued in Application No. PCT/JP2019/051157, dated Jun. 16, 2021.
Office Action issued in Chinese Application No. 201980085814.0, dated Jan. 19, 2023.
Article 94(3) EPC Communication issued in European Application No. 19905813.2-1017, dated Jun. 28, 2023.
Office Action Issued in Chinese Application No. 201980085814.0, dated Jun. 27, 2022.

MULTILAYER FABRIC FOR NONWOVEN FABRIC

TECHNICAL FIELD

The present invention relates to a multilayer fabric used for conveying a nonwoven fabric.

BACKGROUND ART

In the related art, an apparatus configured to supply a fiber aggregate
onto a running endless mesh belt and then form a nonwoven fabric while conveying the fiber aggregate has been developed. One of the characteristics required for such a mesh belt with a recent increase in conveyance speed is grip that allows the fiber aggregate supplied onto the mesh belt to be stably conveyed (the fiber aggregate does not float or shift during conveyance).

For example, a technique has been developed in which a U-shaped composite single fiber using a polyester U-shaped single fiber having a thermoplastic polyurethane ("TPU") insert melt-bonded to a U-shaped pocket is used to impart grip to a sheet being conveyed (see Patent Literature 1).

PATENT LITERATURE

[Patent Literature 1] JP2006-512505 A

SUMMARY OF INVENTION

Technical Problem

The thermoplastic polyurethane described above, however, is not necessarily suitable as yarns used for a fabric for nonwoven fabric from the viewpoint of wear resistance.

The present invention has been made in view of such circumstances, and it is therefore an object of the present invention to provide a new technique applied to a fabric used as a belt suitable for conveying a nonwoven fabric.

Solution to Problem

In order to solve the above-described problems, a multilayer fabric for nonwoven fabric according to an aspect of the present invention includes an upper-surface-side fabric formed from upper-surface-side warps and upper-surface-side wefts, and a lower-surface-side fabric formed from lower-surface-side warps and lower-surface-side wefts, the upper-surface-side fabric and the lower-surface-side fabric being bound together. First warps of the upper-surface-side warps serve as first binding yarns that bind the upper-surface-side fabric and the lower-surface-side fabric, second warps of the lower-surface-side warps serve as second binding yarns that bind the upper-surface-side fabric and the lower-surface-side fabric, and a high-friction yarn having a dynamic friction coefficient that ranges from 0.3 to 1.9 is used as at least some of the upper-surface-side warps and the upper-surface-side wefts.

According to this aspect, since the high-friction yarns are used as at least some of upper-surface-side warps and upper-surface-side wefts of the upper-surface-side fabric that come into contact with the nonwoven fabric to be conveyed, the stability (grip) when conveying the nonwoven fabric increases.

The upper-surface-side warps may include third warps that each pass above one of the upper-surface-side wefts and then passes below the adjacent upper-surface-side weft and above the adjacent lower-surface-side weft. Accordingly, the use of the high-friction yarns as the third warps that are not woven with the lower-surface-side wefts prevents the third warps from wearing out due to a roller or the like with which the lower-surface-side fabric comes into contact and allows an increase in grip of the nonwoven fabric.

The upper-surface-side fabric may be formed by a plain weave. This increases an intersection supporting force and thus prevents fiber sticking.

The upper-surface-side warps are larger in number than the lower-surface-side warps in a weave repeat. Accordingly, the structure of the side where the nonwoven fabric is conveyed (front surface side) becomes dense, which leads to an increase in fiber supportability, smoothness, and knuckle intersection supportability, whereas the structure of the back surface side that is the opposite side becomes sparse, which leads to an increase in air permeability.

At least some of the upper-surface-side warps may be the high-friction yarns. Since the front surface side of the upper-surface-side warps protrude beyond the front surface side of the upper-surface-side wefts, the upper-surface-side warps reliably come into contact with the nonwoven fabric to be conveyed, and the grip increases accordingly.

At least some of the third warps may be the high-friction yarns. Since the binding yarns such as the first binding yarns and the second binding yarns serving as the upper-surface-side warps protrude beyond the back surface side of the lower-surface-side fabric, the binding yarns always come into contact with a machine or a roll. Generally speaking, such high-friction yarns tend to easily wear out and has low resistance to wear. It is thus not very preferable to use the high-friction yarns as some binding yarns from the viewpoint of wear resistance. Therefore, the use of the high-friction yarns as the third warps that are woven only with the upper-surface-side fabric and not woven with the lower-surface-side fabric prevents the high-friction yarns from wearing out due to contact with the machine or the roll.

An upper-surface-side warp density of the upper-surface-side fabric may fall within a range of 70% to 99%. A lower-surface-side warp density of the lower-surface-side fabric may fall within a range of 30% to 65%.

Among the upper-surface-side warps, an upper-surface-side warp having one end and another end joined together to form a loop is not the high-friction yarn. When the upper-surface-side warps to be loop-joined are the high-friction yarns, a pintle yarn is difficult to pass through the loop. Therefore, the use of a structure where the upper-surface-side warps each having one end and another end joined together to form a loop are not the high-friction yarns allows the pintle yarn to easily pass through the loop.

At least some of the upper-surface-side wefts may be the high-friction yarns. This increases the stability (grip) when conveying the nonwoven fabric. Since the upper-surface-side wefts do not protrude from the front surface side of the upper-surface-side fabric, it is possible to suppress, even when the wefts are the high-friction yarns, wear due to friction against a member such as a roll on the return side.

The upper-surface-side wefts that are the high-friction yarns may be woven in a manner as to prevent intersections with the upper-surface-side warps from protruding from an upper surface of the upper-surface-side warps. This prevents the upper-surface-side wefts from protruding from the front surface side on which the nonwoven fabric is conveyed and in turn makes the upper-surface-side wefts less likely to wear out than the upper-surface-side warps.

The first binding yarns and the second binding yarns may form pairs. The first binding yarns may each pass under at least two first lower-surface-side wefts among the lower-surface-side wefts to form a first lower-surface-side intersection, the second binding yarns may each pass under at least two second lower-surface-side wefts different from the first lower-surface-side wefts among the lower-surface-side wefts to form a second lower-surface-side intersection, and the first lower-surface-side intersection and the second lower-surface-side intersection may be formed alternately in a conveyance direction of the nonwoven fabric. Accordingly, on the back surface side of the lower-surface-side fabric, each binding yarn passes under at least two lower-surface-side wefts to form a corresponding lower-surface-side intersection. Therefore, each binding yarn tends to be exposed more on the back surface side of the lower-surface-side fabric, and an area rubbed (worn) against the machine or the roll increases accordingly. This allows an increase in wear resistance and in turn allows an increase in life when the multilayer fabric is used as a belt.

The upper-surface-side warp density of the upper-surface-side fabric may fall within a range of 50% to 90%. The lower-surface-side warp density of the lower-surface-side fabric may fall within a range of 10% to 40%.

Note that any combination of the above-described components, or an entity that results from replacing expressions of the present invention among a method, an apparatus, a system, and the like is also valid as an embodiment of the present disclosure.

Advantageous Effects of Invention

According to the present invention, it is possible to provide a new multilayer fabric for nonwoven fabric serving as a belt suitable for conveying a nonwoven fabric.

DESCRIPTION OF EMBODIMENTS

Hereinafter, the present invention will be described based on embodiments with reference to the drawings. The same or equivalent components, members, and processes shown in the drawings are denoted by the same reference numerals, and redundant description will be omitted as needed. Further, the embodiments are not intended to limit the invention but are given as examples, and all features described in the embodiments and combinations of the features are not necessarily essential to the invention.

Figure 1:
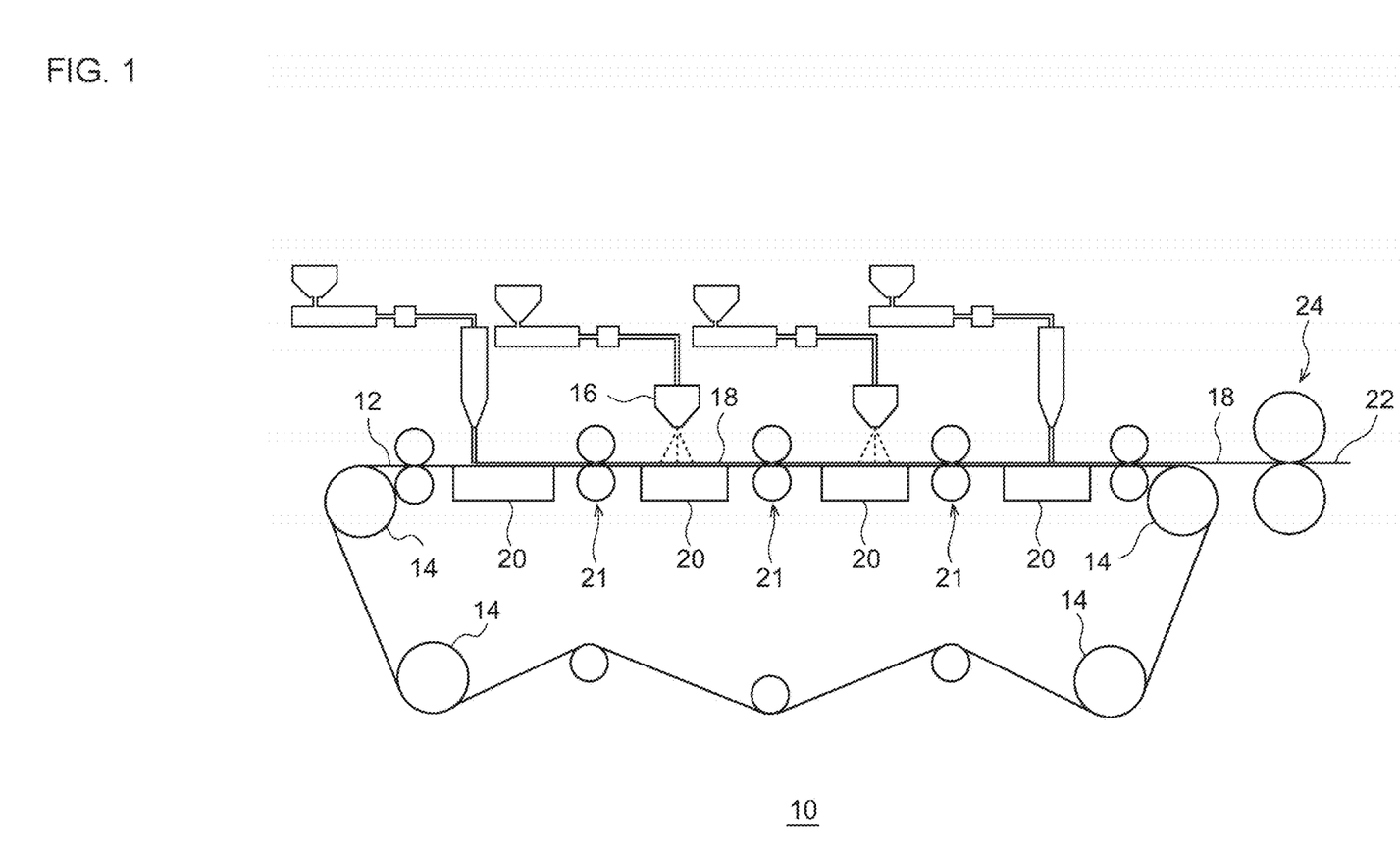
FIG. 1 is a diagram schematically showing a structure of a manufacturing apparatus for manufacturing a nonwoven fabric by spunbonding.

As a method for manufacturing a nonwoven fabric, various methods such as spunbonding and melt blowing have been developed. For example, the spunbonding is a method for manufacturing a nonwoven fabric by stretching a molten resin polymer and accumulating the molten resin polymer thus stretched to form a sheet on a belt for nonwoven fabric. FIG. 1 is a diagram schematically showing a structure of a manufacturing apparatus for manufacturing a nonwoven fabric by spunbonding.

A nonwoven fabric manufacturing apparatus 10 shown in FIG. 1 includes a belt for nonwoven fabric 12 that is an endless belt, a plurality of drive rollers 14 that support and drive the belt for nonwoven fabric 12, an ejector 16 that spins and stretches molten resin polymers and discharges the molten resin polymers onto the belt for nonwoven fabric 12, a suction device 20 that draws, from a back surface of the belt for nonwoven fabric 12, a web 18 formed of the resin polymers discharged onto the belt for nonwoven fabric 12 to accumulate as a fibrous aggregate, a press roll 21 disposed between the suction devices 20 adjacent to each other to cause the belt for nonwoven fabric 12 to be sandwiched, and a calender roll 24 that embosses, by thermocompression bonding, the web 18 to form a sheet-like nonwoven fabric 22. The belt for nonwoven fabric 12 is formed of a multilayer fabric for nonwoven fabric having one end and another end joined together to form a loop.

Such a belt for nonwoven fabric 12 is required to have various characteristics such as no fiber sticking, antifouling property, cleaning property, traveling property, rigidity, static elimination performance, and web stability (grip). In recent years, conveyance stability (grip) of a web has been particularly required with an increase in speed of a nonwoven fabric manufacturing apparatus. For example, when the web is conveyed on the belt for nonwoven fabric with a small grip force, the web to be formed may bend due to movement on the belt for nonwoven fabric, which may lead to a decrease in yield rate of nonwoven fabrics.

Therefore, the inventors of the present application have focused on a high-friction yarn as an element for increasing the grip force, which is one of the characteristics required for the multilayer fabric for nonwoven fabric. Here, the high friction means that a friction coefficient is higher than the friction coefficient of yarns widely known as yarns forming woven fabrics, such as polyethylene terephthalate (PET). Specifically, the determination is made based on a value measured by a measurement method to be described later. Suitable examples of the high-friction yarn include thermoplastic polyurethane.

First, a method for evaluating the effect of the multilayer fabric for nonwoven fabric using the high-friction yarns and a method for measuring the dynamic friction coefficient of the high-friction yarns will be described.

Method for Evaluating Grip

Figure 2:
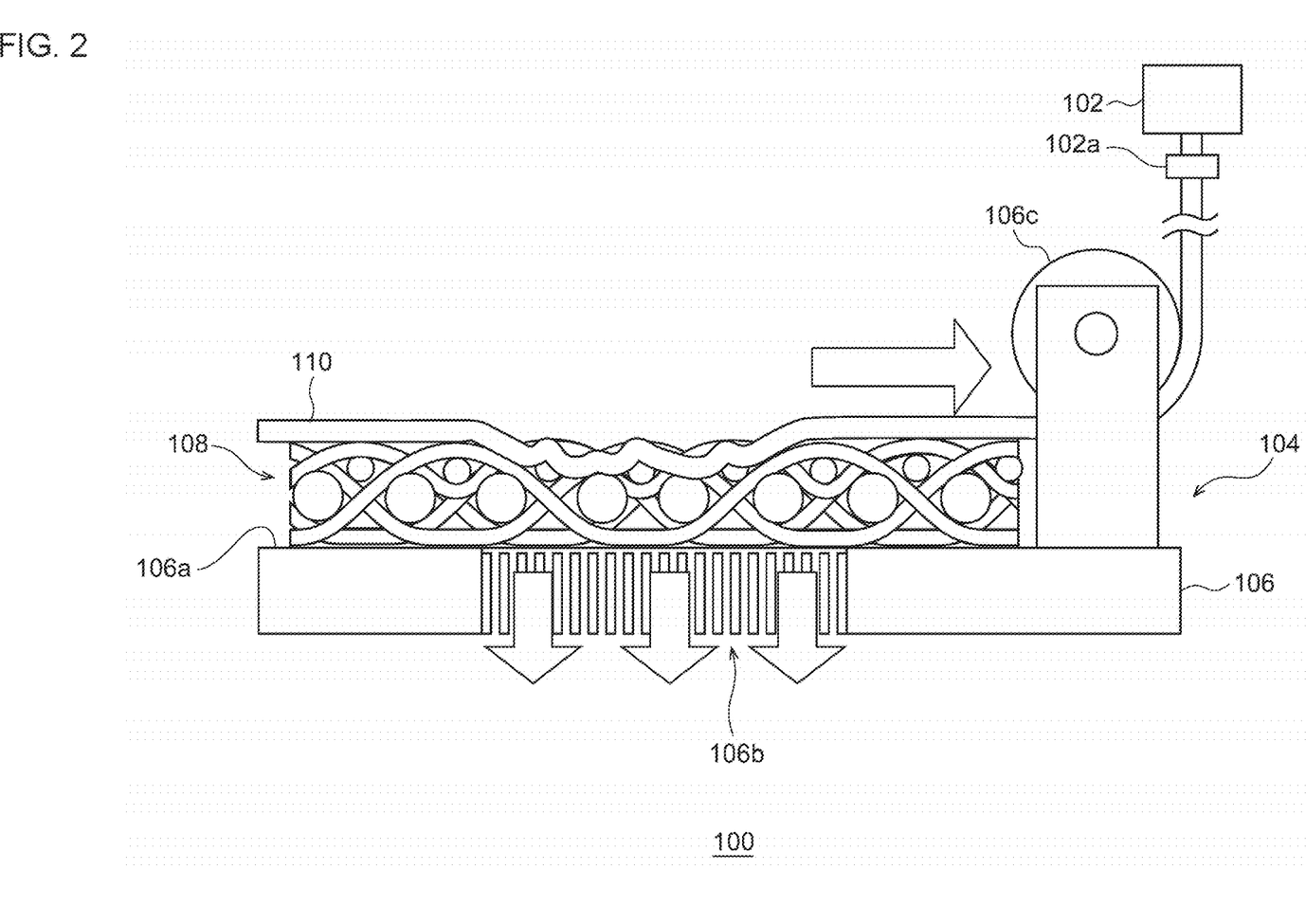
FIG. 2 is a schematic diagram schematically showing a structure of an apparatus for measuring grip of a multilayer fabric for nonwoven fabric with respect to a web (nonwoven fabric).

FIG. 2 is a schematic diagram schematically showing a structure of an apparatus for measuring grip of a multilayer fabric for nonwoven fabric with respect to a web (nonwoven fabric).

A measuring instrument 100 includes a tensile tester 102 and a measurement jig 104. As the tensile tester 102, a precision universal tester Autograph AG-IS (manufactured by SHIMADZU CORPORATION) and a load cell (100N) for a tensile tester were used. A suction box 106 was used as the measurement jig 104. The suction box 106 includes a table 106a on which a multilayer fabric for nonwoven fabric 108 is placed, a suction hole 106b formed extending through the table 106a in order to allow suctioning of a back surface of the multilayer fabric for nonwoven fabric 108, and a roller 106c that changes a tensile direction of a nonwoven fabric 110 from a horizontal direction to a direction toward a chuck 102a of the tensile tester 102.

Under the measurement method, first, the multilayer fabric for nonwoven fabric 108 is placed on the table 106a of the suction box 106. The multilayer fabric for nonwoven fabric 108 used for the measurement has a band shape with a width of 200 mm and a length of 300 mm. Next, the nonwoven fabric 110 is put on the multilayer fabric for nonwoven fabric 108. The nonwoven fabric 110 has a band shape with a width of 90 mm and a length of 600 mm and has one end fixed to the chuck 102a.

Next, a suction device disposed below the suction hole 106b performs suction. The suction device has a suction force of 18.44 kPa and an airflow rate of 1.40 m$^3$/min. In this state, a tensile test by the tensile tester 102 starts. Test conditions are as follows:

Tensile speed: 100 mm/min;
Stroke: 100 mm;
N number (number of measurements): 3; and
Display of measurement results: stress.

Method for Measuring Dry Dynamic Friction Coefficient of Yarn

Figure 3A:
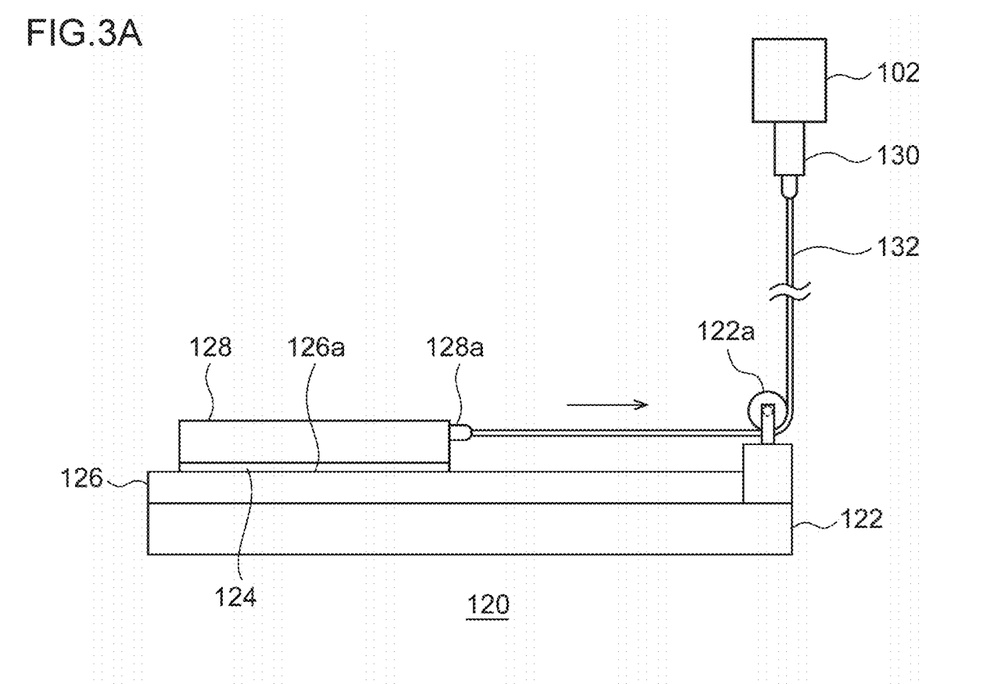
FIG. 3(a) is a schematic diagram schematically showing a structure of an apparatus for measuring a dynamic friction coefficient of yarn.
Figure 3B:
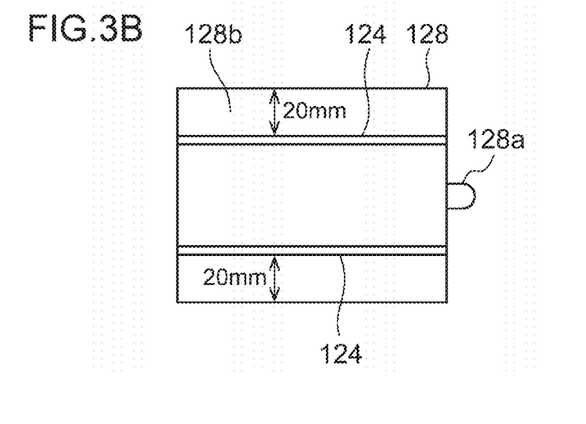
FIG. 3(b) is a rear view of a weight shown in FIG. 3(a).

FIG. 3(a) is a schematic diagram schematically showing a structure of an apparatus for measuring a dynamic friction coefficient of yarn, and FIG. 3(b) is a rear view of a weight shown in FIG. 3(a).

A measuring instrument 120 shown in FIG. 3(a) includes a tensile tester 102, a friction coefficient measurement table 122, a ceramic plate 126 placed on the friction coefficient measurement table 122 and serving as a member to be mated with yarns 124 to be measured for the friction coefficient, and a weight 128 for pressing the yarns 124 against the ceramic plate 126. As the tensile tester 102, a precision universal tester Autograph AG-IS and a load cell (5 kN) for a tensile tester were used. The friction coefficient measurement table 122 has a pulley 122a provided at an end of the friction coefficient measurement table 122. The ceramic plate 126 is made of alumina A479G (manufactured by KYOCERA Corporation) and has a cuboid shape with a width of 80 mm, a length of 300 mm, and a thickness of 15 mm. An upper surface 126a of the ceramic plate 126 that comes into contact with the yarns 124 is mirror-finished and has an arithmetic average roughness Ra of 0.4 μm. The weight 128 having a plate shape has a weight of 200 g and has a hook 128a for pulling provided at an end of the weight 128.

The measurement method is as follows. First, yarns to be measured are prepared by performing heat setting (180° C., five minutes) on yarns and leaving the yarns in a constant temperature and humidity chamber for 24 hours. Note that the heat setting performed on the yarns is a process of maintaining a shape and dimensional stability by applying a heat treatment to fibers with tension applied to the fibers, and no detailed description will be given of the heat setting. Next, an oil agent applied to surfaces of the yarns is wiped off with a paper towel containing alkazole. As shown in FIG. 3(b), the yarns 124 are attached to a back surface 128b of the weight 128 with a double-sided tape. The yarns are attached to a position 20 mm away inward from left and right ends of the weight 128 and are fixed to the weight 128 so that a longitudinal direction and tensile direction of the yarns 124 are aligned.

Next, a flexible joint 130 is attached to the load cell of the tensile tester 102. The flexible joint 130 has an end tied to one end of an aramid fiber serving as a pulling string 132. Next, the surface of the ceramic plate 126 is wiped with a paper towel containing alkazole and placed on the friction coefficient measurement table 122. The pulling string 132 is looped over the pulley 122a.

Subsequently, the weight 128 is placed on the ceramic plate 126 with the yarns 124 interposed between the weight 128 and the ceramic plate 126 so as to cause the back surface 128b of the weight 128 to face the upper surface 126a of the ceramic plate 126. Then, the other end of the pulling string 132 is attached to the hook 128a of the weight 128. In this state, a tensile test by the tensile tester 102 starts. Test conditions are as follows:

Tensile speed: 500 mm/min;
Stroke: 150 mm; and
N number (number of measurements): 3.

In the tensile test, the yarns 124 are slid on the ceramic plate 126 with a constant load applied by the weight 128, and the stress (kgf) at this time is recorded. Then, the dynamic friction coefficient is obtained by normalizing the average value of stress by weight. The dynamic friction coefficients obtained by the above-described measurement method are as follows:

Dynamic friction coefficient of PET yarn having a diameter of 0.40 mm, manufactured by A company: 0.177;
Dynamic friction coefficient of TPU high-friction yarn (1) having a diameter of 0.40 mm, manufactured by B company: 0.789;
Dynamic friction coefficient of TPU high-friction yarn (2) having a diameter of 0.40 mm manufactured by B company: 1.092; and
Dynamic friction coefficient of TPE high-friction yarn having a diameter of 0.43 mm, manufactured by C company: 1.761.

Next, a multilayer fabric for nonwoven fabric composing a belt for nonwoven fabric using a high-friction yarn will be described. In the following description, "warp" represents a yarn that extends along a conveyance direction of a web when a multilayer fabric for nonwoven fabric is a loop-shaped belt for nonwoven fabric, and "weft" represents a yarn that extends in a direction intersecting the warp. Further, when the multilayer fabric for nonwoven fabric is used as the belt for nonwoven fabric, "upper-surface-side fabric" represents a fabric positioned on the front surface side of the belt for nonwoven fabric on which the web is conveyed, and "lower-surface-side fabric" represents a fabric positioned on the back surface side of the belt for nonwoven fabric that mainly comes into contact with the drive roller. Note that "front surface" simply represents a surface on an exposed side of the upper-surface-side fabric or the lower-surface-side fabric. The "front surface" of the upper-surface-side fabric corresponds to the front surface side of the belt for nonwoven fabric, whereas the "front surface" of the lower-surface-side fabric corresponds to the back surface side of the belt for nonwoven fabric.

Further, "design diagram" corresponds to the smallest repeating unit of a fabric structure, that is, a weave repeat of a fabric. That is, the "weave repeat" is repeated back and forth and right and left to form a "fabric". Further, "knuckle" refers to a portion where a warp passes above or under one or a plurality of wefts to protrude from the surface. Further, "off-stack structure" represents a structure where yarns arranged in the vertical direction do not overlap each other.

Further, "intersection supporting force of yarn" is a force applied between a warp and a weft at a knuckle portion. In general, the intersection supporting force tends to be high when a knuckle is caught on a single yarn, whereas the intersection supporting force tends to be low when a long knuckle is caught on a plurality of yarns. Therefore, a structure having the highest intersection supporting force is a plain weave structure. This is because the plain weave structure has each knuckle caught on a single yarn, making the knuckle density highest.

Further, "binding yarn" represents at least some of the warps of the upper-surface-side fabric (or the lower-surface-side fabric) that are originally supposed to be woven only with the wefts of the upper-surface-side fabric (or the lower-surface-side fabric) are woven with the wefts of the lower-surface-side fabric (or the upper-surface-side fabric) from the back surface side (or the front surface side) to bind the upper-surface-side fabric and the lower-surface-side fabric.

Further, fiber sticking is a phenomenon where fibers enter into a space between the knuckle intersections of yarns. When fiber sticking occurs, problems such as (1) an occurrence of a defect in the web or (2) suction effect by suction is reduced and grip of a web is reduced due to a decrease in air permeability of a fabric where the fiber sticking occurs.

Note that upper-surface-side warps and lower-surface-side warps forming the following fabrics preferably have a diameter of about 0.35 mm to 0.50 mm, but are not necessarily limited to this range. Likewise, the upper-surface-side wefts preferably have a diameter of about 0.40 mm to 0.50 mm, and the lower-surface-side wefts preferably have a diameter of about 0.50 mm to 0.80 mm, but are not necessarily limited to such ranges.

First Embodiment

Figure 4:
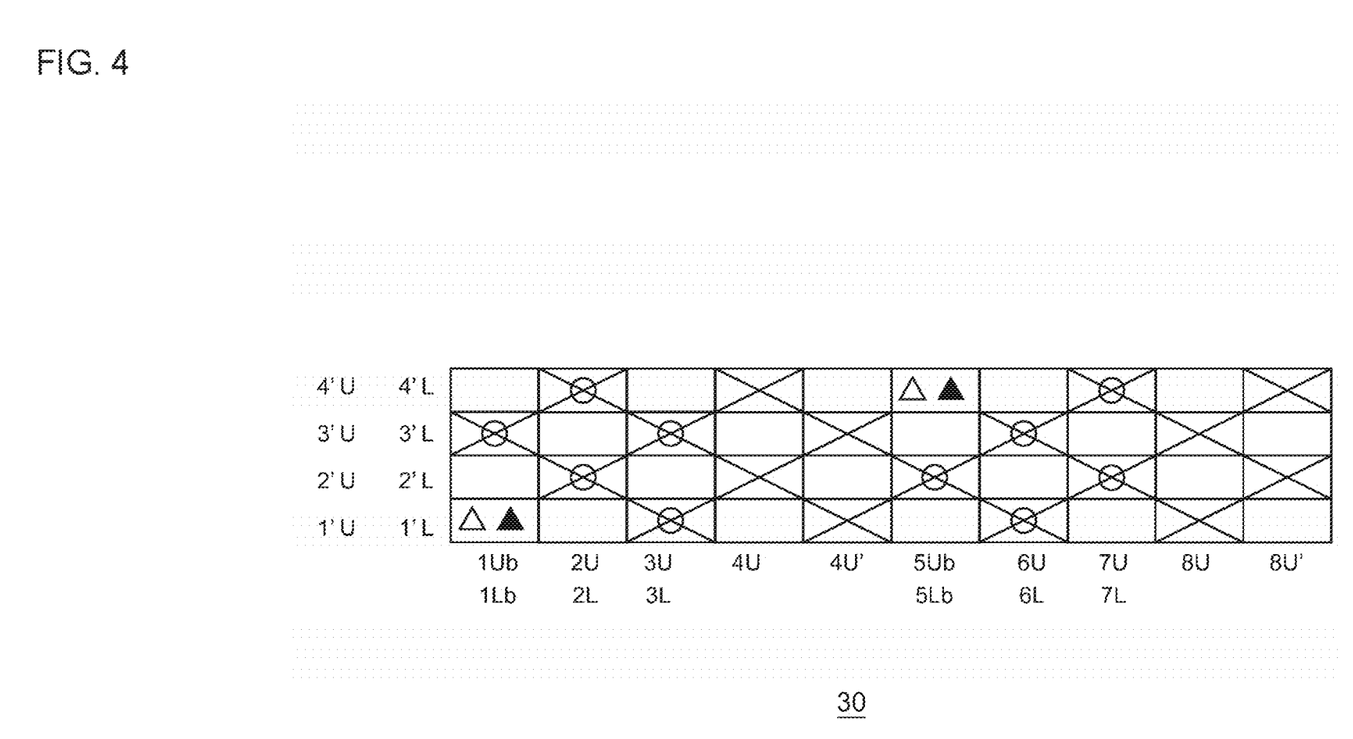
FIG. 4 is a design diagram showing a weave repeat of a multilayer fabric for nonwoven fabric according to a first embodiment.
Figure 5:
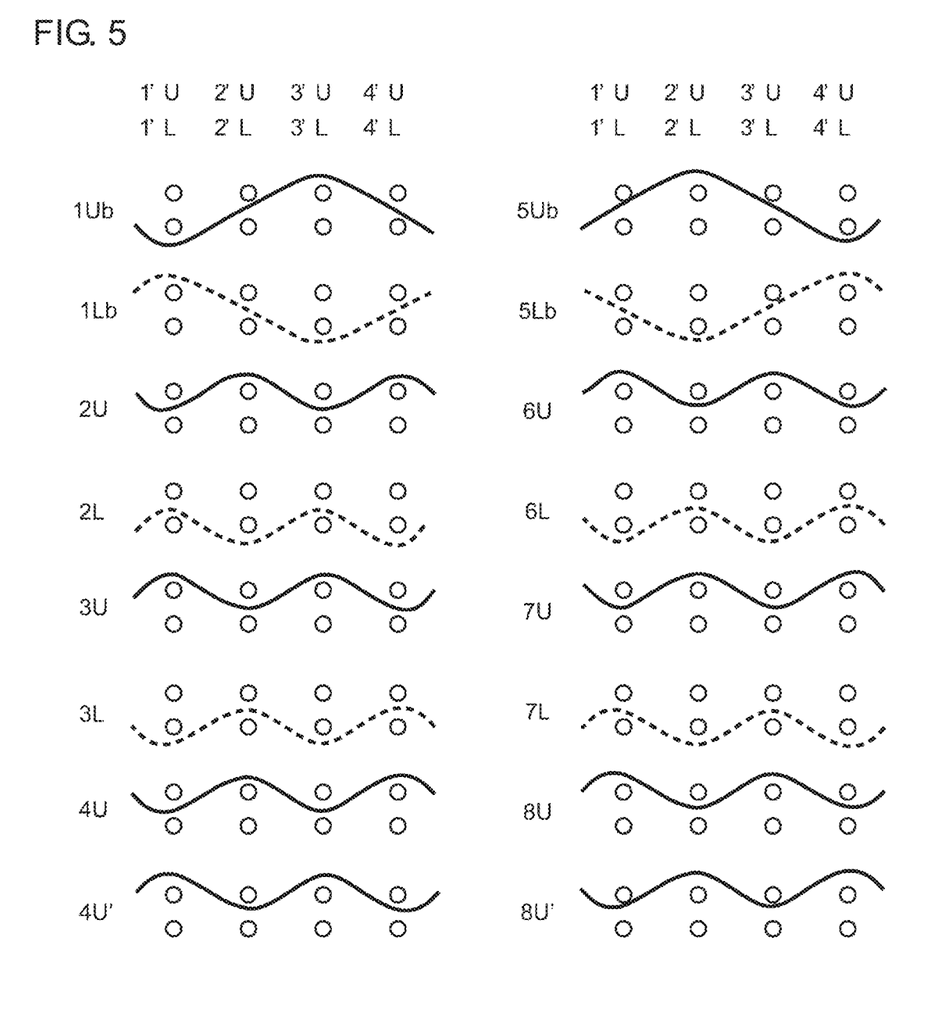
FIG. 5 is a cross-sectional view taken along each warp in the design diagram shown in FIG. 4.

Hereinafter, a description will be given of a structure of a multilayer fabric for nonwoven fabric according to a first embodiment with reference to the drawings. FIG. 4 is a design diagram showing a weave repeat of the multilayer fabric for nonwoven fabric according to the first embodiment. FIG. 5 is a cross-sectional view taken along each warp in the design diagram shown in FIG. 4. Further, as shown in FIG. 4, for the sake of convenience, warp pairs C (4U and 4U', and 8U and 8U') are each divided into two rows because the upper-surface-side warps are arranged side by side.

In the design diagram, the warps are denoted by Arabic numerals such as 1, 2, or 3. The wefts are denoted by Arabic numerals with a prime such as 1', 2', or 3'. The upper-surface-side yarns are denoted by numerals with a letter U or U', and the lower-surface-side yarns are denoted by numerals with a letter L, such as 1'U or 2'L. Further, the binding yarns that bind the upper-surface-side fabric and the lower-surface-side fabric are denoted by numbers with a letter b.

In the design diagram, a filled triangle mark represents that a yarn originally supposed to serve as a lower-surface-side warp is located above an upper-surface-side wefts, a cross mark represents that an upper-surface-side warp is located above an upper-surface-side weft, a blank triangle mark represents that a yarn originally supposed to serve as an upper-surface-side warp is located under a lower-surface-side weft, and a circle mark represents that a lower-surface-side warp is located under a lower-surface-side weft. Note that as shown in FIG. 5, the upper-surface-side warps are represented by solid lines, and the lower-surface-side warps are represented by dotted lines.

A multilayer fabric for nonwoven fabric 30 according to the first embodiment shown in FIG. 4 is a multilayer fabric having a surface plain weave structure formed of, from the left side, one warp pair A (1Ub and 1Lb), two warp pairs B (2U and 2L, and 3U and 3L), one warp pair C (4U and 4U'), one warp pair A (5Ub and 5Lb), two warp pairs B (6U and 6L, and 7U and 7L), one warp pair C (8U and 8U'), upper-surface-side wefts (1'U, 2'U, 3'U, 4'U), and lower-surface-side wefts (1'L, 2'L, 3'L, 4'L).

As shown in FIG. 5, the upper-surface-side warp 1Ub that is a part of the warp pair A and serves as a binding yarn is woven by passing under the lower-surface-side weft 1'L to form a back-surface-side knuckle, passing between the upper-surface-side weft 2'U and the lower-surface-side weft 2'L, passing above the upper-surface-side weft 3'U to form a front-surface-side knuckle, and then passing between the upper-surface-side weft 4'U and the lower-surface-side weft 4'L.

Further, the lower-surface-side warp 1Lb that is a part of the warp pair A and serves as a binding yarn is woven by passing above the upper-surface-side weft 1'U to form a front-surface-side knuckle, passing between the upper-surface-side weft 2'U and the lower-surface-side weft 2'L, passing under the lower-surface-side weft 3'L to form a back-surface-side knuckle, and then passing between the upper-surface-side weft 4'U and the lower-surface-side weft 4'L.

Further, the upper-surface-side warp 2U that is a part of the warp pair B is woven by passing under the upper-surface-side weft 1'U, passing above the upper-surface-side weft 2'U to form a front-surface-side knuckle, passing under the upper-surface-side weft 3'U, and then passing above the upper-surface-side weft 4'U to form another front-surface-side knuckle.

Further, the lower-surface-side warp 2L that is a part of the warp pair B is woven by passing above the lower-surface-side weft 1'L, passing under the lower-surface-side weft 2'L to form a back-surface-side knuckle, passing above the lower-surface-side weft 3'L, and then passing under the lower-surface-side weft 4'L to form another back-surface-side knuckle.

Further, the upper-surface-side warp 3U that is a part of the warp pair B is woven by passing above the upper-surface-side weft 1'U to form a front-side knuckle, passing under the upper-surface-side weft 2'U, passing above the upper-surface-side weft 3'U to form another front-surface-side knuckle, and then passing under the upper-surface-side weft 4'U.

Further, the lower-surface-side warp 3L that is a part of the warp pair B is woven by passing under the lower-surface-side weft 1'L to form a back-surface-side knuckle, passing above the lower-surface-side weft 2'L, passing under the lower-surface-side weft 3'L to form another back-surface-side knuckle, and then passing above the lower-surface-side weft 4'L.

Further, the upper-surface-side warp 4U that is a part of the warp pair C is woven by passing under the upper-surface-side weft 1'U, passing above the upper-surface-side weft 2'U to form a front-surface-side knuckle, passing under the upper-surface-side weft 3'U, and then passing above the upper-surface-side weft 4'U to form another front-surface-side knuckle.

Further, the upper-surface-side warp 4U' that is a part of the warp pair C is woven by passing above the upper-surface-side weft 1'U to form a front-side knuckle, passing under the upper-surface-side weft 2'U, passing above the upper-surface-side weft 3'U to form another front-surface-side knuckle, and then passing under the upper-surface-side weft 4'U.

Further, the upper-surface-side warp 5Ub that is a part of the warp pair A and serves as a binding yarn passes between the upper-surface-side weft 1'U and the lower-surface-side weft 1'L, passes above the upper-surface-side weft 2'U to form a front-surface-side knuckle, passes between the upper-surface-side weft 3'U and the lower-surface-side weft 3'L, and then passes under the lower-surface-side weft 4'L to form a back-surface-side knuckle.

Further, the lower-surface-side warp 5Lb that is a part of the warp pair A and serves as a binding yarn passes between the upper-surface-side weft 1'U and the lower-surface-side weft 1'L, passes under the lower-surface-side weft 2'L to form a back-surface-side knuckle, passes between the upper-surface-side weft 3'U and the lower-surface-side weft 3'L, and then passes above the upper-surface-side weft 4'U to form a front-surface-side knuckle.

Further, the upper-surface-side warp 6U that is a part of the warp pair B is woven by passing above the upper-surface-side weft 1'U to form a front-side knuckle, passing under the upper-surface-side weft 2'U, passing above the upper-surface-side weft 3'U to form another front-surface-side knuckle, and then passing under the upper-surface-side weft 4'U.

Further, the lower-surface-side warp 6L that is a part of the warp pair B is woven by passing under the lower-surface-side weft 1'L to form a back-surface-side knuckle, passing above the lower-surface-side weft 2'L, passing under the lower-surface-side weft 3'L to form another back-surface-side knuckle, and then passing above the lower-surface-side weft 4'L.

Further, the upper-surface-side warp 7U that is a part of the warp pair B passes under the upper-surface-side weft 1'U, passes above the upper-surface-side weft 2'U to form a front-surface-side knuckle, passes under the upper-surface-side weft 3'U, and then passes above the upper-surface-side weft 4'U to form another front-surface-side knuckle.

Further, the lower-surface-side warp 7L that is a part of the warp pair B passes above the lower-surface-side weft 1'L, passes under the lower-surface-side weft 2'L to form a back-surface-side knuckle, passes above the lower-surface-side weft 3'L, and then passes under the lower-surface-side weft 4'L to form another back-surface-side knuckle.

Further, the upper-surface-side warp 8U that is a part of the warp pair C is woven by passing above the upper-surface-side weft 1'U to form a front-side knuckle, passing under the upper-surface-side weft 2'U, passing above the upper-surface-side weft 3'U to form another front-surface-side knuckle, and then passing under the upper-surface-side weft 4'U.

Further, the upper-surface-side warp 8U' that is a part of the warp pair C passes under the upper-surface-side weft 1'U, passes above the upper-surface-side weft 2'U to form a front-surface-side knuckle, passes under the upper-surface-side weft 3'U, and then passes above the upper-surface-side weft 4'U to form another front-surface-side knuckle.

With the above-described structure, the multilayer fabric for nonwoven fabric 30 according to the first embodiment has a plain weave structure formed on the front surface. In the belt for nonwoven fabric using the multilayer fabric for nonwoven fabric 30 having a plain weave structure regularly formed on the front surface, the number of fiber supporting points of the fabric that support the nonwoven fabric (web) is large, allowing an increase in web supportability. Further, the upper-surface-side fabric formed by a plain weave is higher in intersection supporting force to prevent fiber sticking.

In the multilayer fabric for nonwoven fabric 30, the upper-surface-side fabric formed from the upper-surface-side warps (1Ub, 2U, 3U, 4U, 4U', 5Ub, 6U, 7U, 8U, 8U') and the upper-surface-side wefts (1'U, 2'U, 3'U, 4'U) and the lower-surface-side fabric formed from the lower-surface-side warps (1Lb, 2L, 3L, 5Lb, 6L, 7L) and the lower-surface-side wefts (1'L, 2'L, 3'L, 4'L) are bound together. First warps (1Ub, 5Ub) of the upper-surface-side warps serve as first binding yarns that bind the upper-surface-side fabric and the lower-surface-side fabric, and second warps (1Lb, 5Lb) of the lower-surface-side warps serve as second binding yarns that bind the upper-surface-side fabric and the lower-surface-side fabric.

High-friction yarns are used as at least some of the upper-surface-side warps. In the multilayer fabric for nonwoven fabric 30 according to the present embodiment, high-friction yarns having a dynamic friction coefficient of 0.3 to 1.9 are used as the upper-surface-side warps (2U, 7U). Further, it is preferable that the high-friction yarns have a dynamic friction coefficient of 0.3 to 1.5. The high-friction yarns according to the present embodiment are made of thermoplastic polyurethane.

In the multilayer fabric for nonwoven fabric 30 having the high-friction yarns used as some of the upper-surface-side warps, since the high-friction yarns are used as the upper-surface-side warps (2U, 7U) of the upper-surface-side fabric that come into contact with the nonwoven fabric to be conveyed, the stability (grip) when conveying the nonwoven fabric increases.

Figure 6:
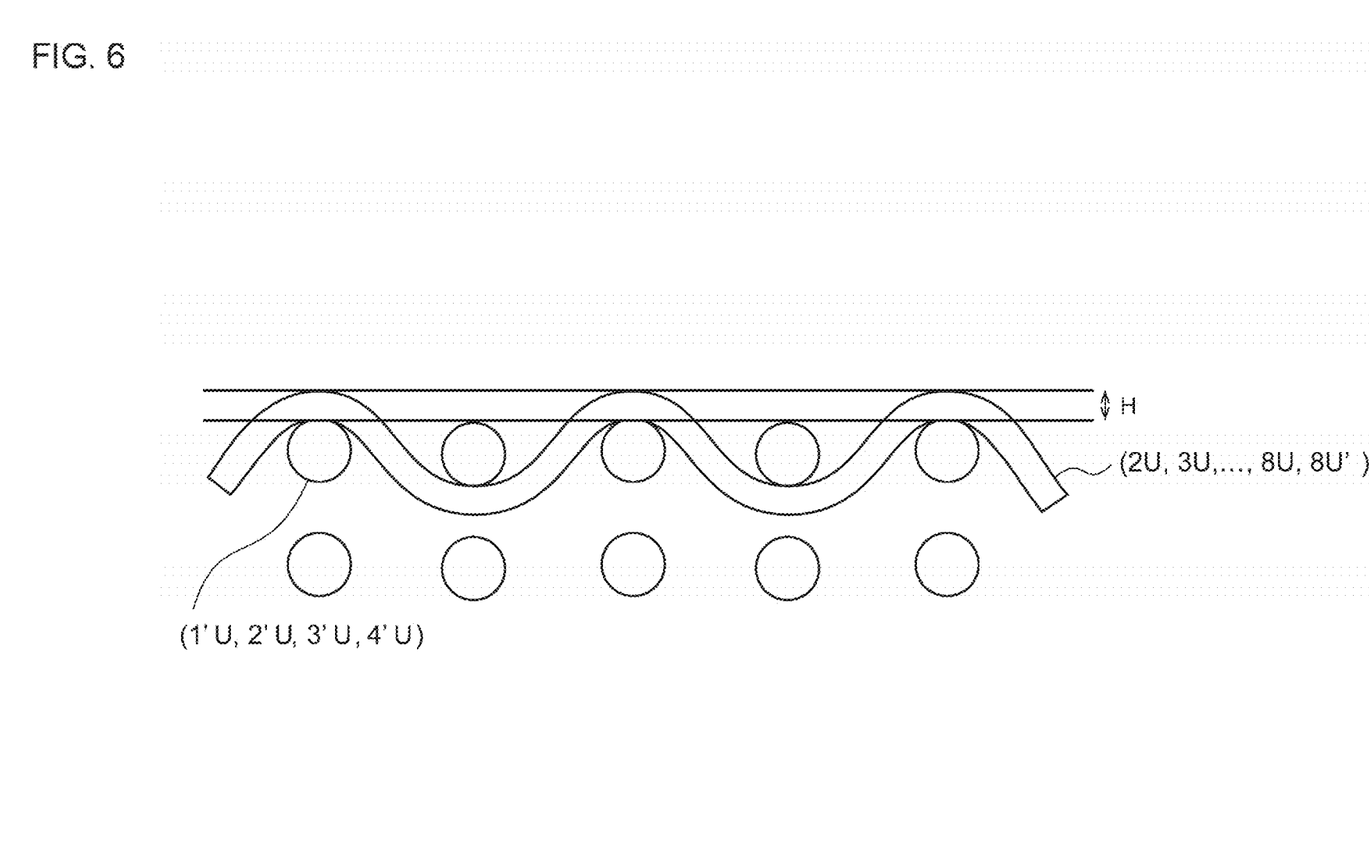
FIG. 6 is a schematic diagram showing a height difference H between an upper surface of third warps and an upper surface of upper-surface-side wefts.

The upper-surface-side warps include third warps (2U, 3U, 4U, 4U', 6U, 7U, 8U, 8U') that each pass above one of the upper-surface-side weft and then pass under the adjacent upper-surface-side weft and above the adjacent lower-surface-side weft. FIG. 6 is a schematic diagram showing a height difference H between the upper surface of the third warps (2U, 3U, to 8U, 8U') and the upper surface of the upper-surface-side wefts (1'U to 4'U). As shown in FIG. 6, since the upper-surface-side wefts (1'U, 2'U, 3'U, 4'U) do not protrude from the front surface side on which the nonwoven fabric is conveyed, the upper-surface-side wefts are less likely to wear out than the upper-surface-side warps. In other words, since the front surface side of the upper-surface-side warps (2U, 7U) that are high-friction yarns protrude beyond the front surface side of the upper-surface-side wefts, the upper-surface-side warps reliably come into contact with the nonwoven fabric to be conveyed, and the grip increases accordingly. Note that the height difference H according to the present embodiment is about 280 μm.

Further, in the multilayer fabric for nonwoven fabric 30, the number of the upper-surface-side warps (10 warps) is larger than the number of the lower-surface-side warps (6 warps) in the weave repeat. Accordingly, the structure of the side where the nonwoven fabric is conveyed (front surface side) becomes dense, which leads to an increase in fiber supportability, smoothness, and knuckle intersection supportability, whereas the structure of the back surface side that is the opposite side becomes sparse, which leads to an increase in air permeability.

Note that since the binding yarns such as the first binding yarns (1Ub, 5Ub) and the second binding yarns (1Lb, 5Lb) serving as the upper-surface-side warps protrude beyond the back surface side of the lower-surface-side fabric, the binding yarns always come into contact with a machine or a roll. Therefore, in the multilayer fabric for nonwoven fabric 30, since it is not preferable that the high-friction yarns are used as the binding yarns from the viewpoint of wear resistance, PET yarns are used as the material of the binding yarns (1Ub, 1Lb, 5Ub, 5Lb). Likewise, the PET yarns are used as the material of the lower-surface-side warps (2L, 3L, 6L, 7L). That is, the use of the high-friction yarns as the third warps (2U, 7U) that are woven only with the upper-surface-side fabric and not woven with the lower-surface-side fabric prevents the high-friction yarns from wearing out due to contact with the machine or the roll.

Note that, in the multilayer fabric for nonwoven fabric 30 according to the present embodiment, the upper-surface-side warp density of the upper-surface-side fabric preferably falls in a range of 70% to 99%, and the lower-surface-side warp density of the lower-surface-side fabric preferably falls in a range of 30% to 65%.

Warp Density

Warp density is the total occupancy of upper warps and lower warps present per inch (25.4 mm). Further, in the following description, the number of meshes represents the number of warps/wefts present per inch (counted separately for the upper-surface-side fabric and the lower-surface-side fabric).

For example, in a case where 20 upper-surface-side warps (upper warps+upper binding yarns) and 20 lower-surface-side warps (lower warps+lower binding yarns) are present per inch, the number of meshes of the upper-surface-side warps is 20 meshes, and the number of meshes of the lower-surface-side warps is 20 meshes.

Further, the warp density is expressed by $\{[(\text{occupancy distance of upper-surface-side warps X1}) + (\text{occupancy distance of lower-surface-side warps X2})]/25.4\}*100\%$. Note that the upper-surface-side warp density is expressed by $[(\text{occupancy distance of upper-surface-side warps X1})/25.4]*100\%$, and the lower-surface-side warp density is expressed by $[(\text{occupancy distance of lower-surface-side warps X1})/25.4]*100\%$.

Specifically, when the warp density is such that the upper-surface-side warps have a diameter of 0.40 mm and 30 meshes and the lower-surface-side warps have a diameter of 0.40 mm and 20 meshes, the occupancy distance of upper-surface-side warps X1=0.40 mm/yarn*30 yarn/inch=12 mm/inch, the occupancy distance of lower-surface-side warps X2=0.40 mm/yarn*20 yarn/inch=8 mm/inch, and X1+X2=20 mm/inch.

Therefore, the warp density=[(X1+X2) mm/inch/25.4 mm/inch]*100=(20/25.4)*100=78.74%.

Likewise, the upper-surface-side warp density is 47.24%, and the lower-surface-side warp density is 31.50%.

The diameter of each yarn preferably falls within a range of 0.10 to 1.20, for example. For example, the first binding yarns (1Ub, 5Ub) are carbon yarns having a diameter of 0.39 mm and are capable of eliminating static electricity from yarns. Further, the upper-surface-side warps (3U, 4U, 4U', 6U, 8U, 8U') and the lower-surface-side warps (2L, 3L, 6L, 7L) are PET yarns having a diameter of 0.39 to 0.40 mm. Further, the third warps (2U, 7U) that are high-friction yarns are TPU yarns having a diameter of 0.4 mm.

As described above, in the multilayer fabric for nonwoven fabric 30, the upper-surface-side warp density is increased to 70% to 99%, thereby allowing an increase in web supportability and preventing fiber sticking. On the other hand, in the multilayer fabric for nonwoven fabric 30, since the lower-surface-side warp density is as low as 30% to 65% and thus air permeability is secured, the web 18 is easily drawn to the upper-surface-side fabric by suction of the suction device 20. This makes the web 18 less likely to separate from the front surface of the upper-surface-side fabric and in turn increases web supportability.

Figure 7:
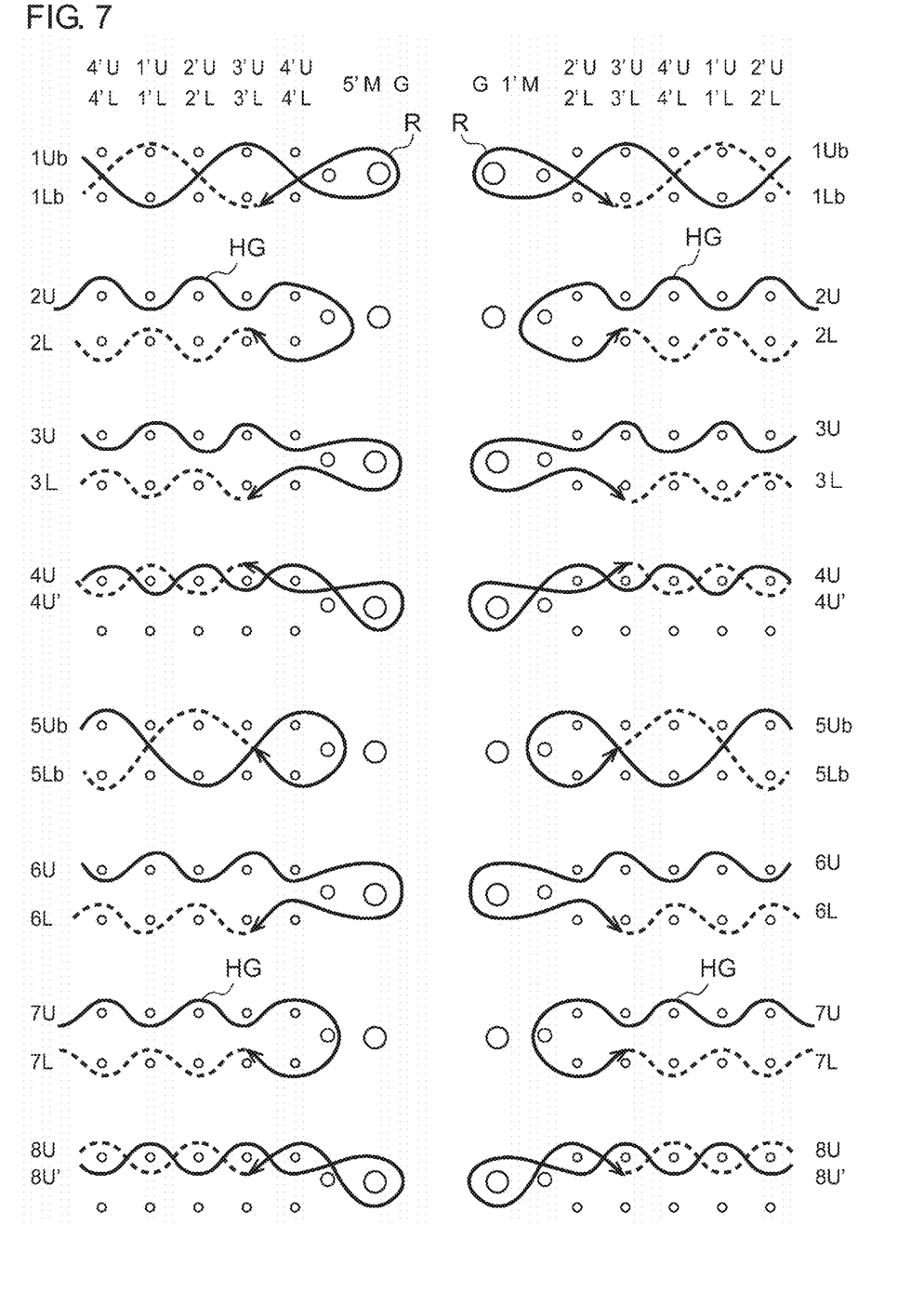
FIG. 7 is a diagram for explaining loop joints at both ends of the multilayer fabric for nonwoven fabric according to the first embodiment.

Further, the multilayer fabric for nonwoven fabric 30 according to the present embodiment has both ends joined together to form an endless loop and is used as the belt for nonwoven fabric 12, but there is a restriction on which warp is used at both the ends to form a loop. FIG. 7 is a diagram for explaining loop joints at both the ends of the multilayer fabric for nonwoven fabric according to the first embodiment.

As shown in FIG. 7, intermediate wefts 1'M, 5'M serving as bone yarns are added to the outside of the wefts located at both the ends. Some of the warps form loops R on the outside of the intermediate wefts 1'M, 5'M, and a pintle yarn G is passed through each loop R, so that the multilayer fabric for nonwoven fabric 30 becomes the endless belt for nonwoven fabric 12.

In the multilayer fabric for nonwoven fabric 30 according to the present embodiment, among the plurality of upper-surface-side warps, the upper-surface-side warps (3U, 4U, 4U', 6U, 8U, 8U') each having one end and another end joined together to form a loop are not the high-friction yarns HG. When the upper-surface-side warps to be loop-joined are the high-friction yarns, the pintle yarn is difficult to pass through the loop. Therefore, the use of a structure where the upper-surface-side warps each having one end and another end joined together to form a loop are not the high-friction yarns allows the pintle yarn G to easily pass through the loop R.

Second Embodiment

Figure 8:
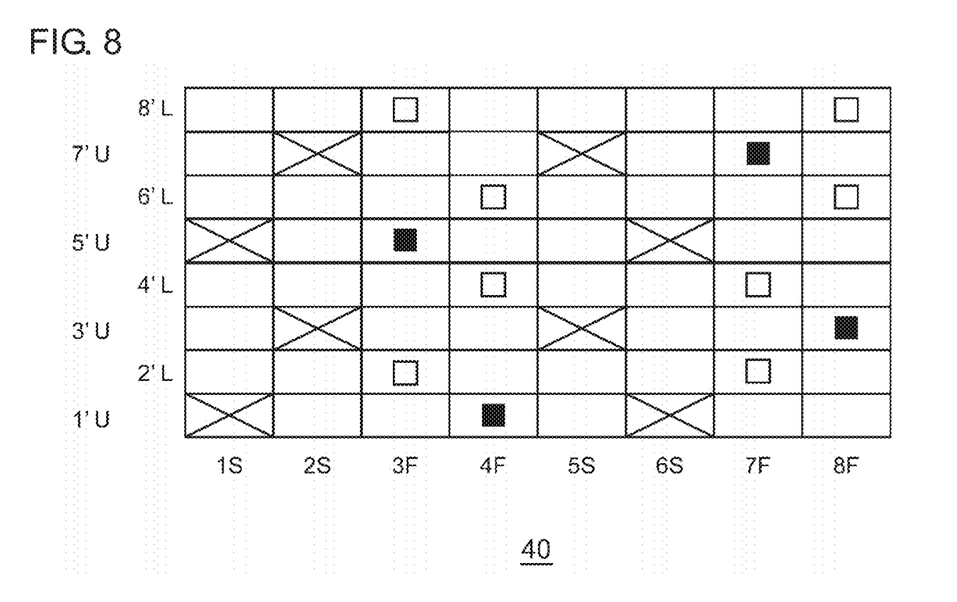
FIG. 8 is a design diagram showing a weave repeat of a multilayer fabric for nonwoven fabric according to a second embodiment.
Figure 9:
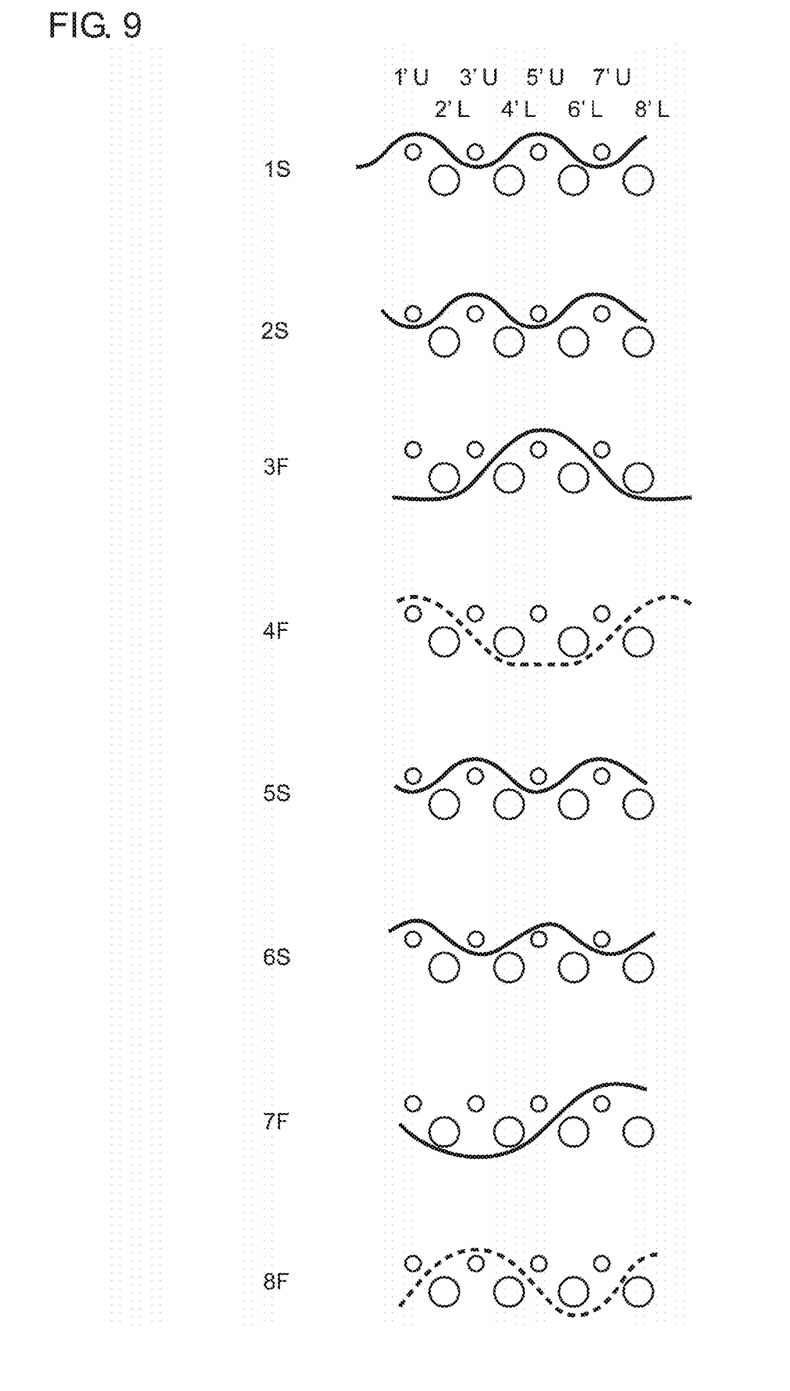
FIG. 9 is a cross-sectional view taken along each warp in the design diagram shown in FIG. 8.

Hereinafter, a description will be given of a structure of a multilayer fabric for nonwoven fabric according to a second embodiment with reference to the drawings. FIG. 8 is a design diagram showing a weave repeat of the multilayer fabric for nonwoven fabric according to the second embodiment. FIG. 9 is a cross-sectional view taken along each warp in the design diagram shown in FIG. 8.

In the design diagram, the warps are denoted by Arabic numerals such as 1, 2, or 3. The binding yarns are denoted by numerals with a letter F, and the non-binding yarns are denoted by numerals with a letter S. The wefts are denoted by Arabic numerals with a prime such as 1', 2', or 3'. The upper-surface-side wefts are denoted by numerals with a letter U, and the lower-surface-side wefts are denoted by numerals with a letter L, such as 1'U or 2'L.

Further, in the design diagram, a filled square mark represents that a binding yarn is located above an upper-surface-side weft, a blank square mark represents that a binding yarn is located under a lower-surface-side weft, and a cross mark represents that a non-binding yarn is located above an upper-surface-side weft.

A multilayer fabric for nonwoven fabric 40 according to the present embodiment is a multilayer fabric in which the upper-surface-side wefts and the lower-surface-side wefts are arranged so as not to overlap each other. Overlapping of yarns in the design diagram is denoted by numerals indicating yarns in the left part of the design diagram.

The multilayer fabric for nonwoven fabric 40 according to the second embodiment shown in FIG. 8 is a multilayer fabric having a surface plain weave structure formed from the binding yarns F, the non-binding yarns S, the upper-surface-side wefts U, and the lower-surface-side wefts L.

As shown in FIG. 8, the binding yarn 4F passes above the upper-surface-side weft 1'U to form an upper-surface-side knuckle, passes above the lower-surface-side weft 2'L, passes under the upper-surface-side weft 3'U, and then passes under the lower-surface-side weft 4'L and the lower-surface-side weft 6'L to form a back-surface-side knuckle. The binding yarn 4F further passes under the upper-surface-side weft 7'U and then passes above the lower-surface-side weft 8'L.

Further, the binding yarn 3F is paired with the adjacent binding yarn 4F. The binding yarn 3F forms an upper-surface-side knuckle above the upper-surface-side weft 5'U. The two binding yarns including the binding yarn 3F and the binding yarn 4F form a knuckle above the upper-surface-side weft 1'U and the upper-surface-side weft 5'U while forming one upper-surface-side warp structure on the front surface.

The non-binding yarn 1S passes above the upper-surface-side weft 1'U to form an upper-surface-side knuckle, passes under the upper-surface-side weft 3'U, passes above the upper-surface-side weft 5'U to form an upper-surface-side knuckle, and then passes under the upper-surface-side weft 7'U.

In the multilayer fabric for nonwoven fabric 40 according to the second embodiment, as shown in FIG. 8, each two of the binding yarns F and the non-binding yarns S form a pair, and the non-binding yarns 1S, 2S and the binding yarns 3F, 4F are grouped, and the non-binding yarns 5S, 6S and the binding yarns 7F, 8F are grouped.

Next, a description will be given of the wefts shown in FIG. 8. The diameters of the upper-surface-side wefts (1'U, 3'U, 5'U, 7'U) and the lower-surface-side wefts (2'L, 4'L, 6'L, 8'L) are not limited to a specific diameter, but the lower-surface-side wefts are preferably large in diameter in order to increase the rigidity of the fabric, and the upper-surface-side wefts are preferably thinner than the lower-surface-side wefts in order to increase the surface density. Further, the upper-surface-side wefts and the lower-surface-side wefts in the multilayer fabric for nonwoven fabric 40 have an off-stack structure. Applying the off-stack structure to the multilayer fabric for nonwoven fabric 40 brings the upper-surface-side wefts and the lower-surface-side wefts into more intimate contact with each other to make the space lower, thereby preventing fiber sticking.

As is apparent from the design diagram, the multilayer fabric for nonwoven fabric 40 has a structure where the back-surface-side knuckles are less in number than the front-surface-side knuckles.

As described above, in the multilayer fabric for nonwoven fabric 40, the upper-surface-side fabric formed from the upper-surface-side warps (1S, 2S, 3F, 5S, 6S, 7F) and the upper-surface-side wefts (1'U, 3'U, 5'U, 7'U) and the lower-surface-side fabric formed from the lower-surface-side warps (4F, 8F) and the lower-surface-side wefts (2'L, 4'L, 6'L, 8'L) are bound together. The first warps (3F, 7F) of the upper-surface-side warps serve as the first binding yarns that bind the upper-surface-side fabric and the lower-surface-side fabric, and the second warps (4F, 8F) of the lower-surface-side warps serve as the second binding yarns that bind the upper-surface-side fabric and the lower-surface-side fabric. Further, the high-friction yarns having a dynamic friction coefficient of 0.3 to 1.9 are used as at least some of the upper-surface-side wefts (1'U, 3'U, 5'U, 7'U).

As described above, in the multilayer fabric for nonwoven fabric 40, since the high-friction yarns are used as at least some of the upper-surface-side wefts of the upper-surface-side fabric that come into contact with the nonwoven fabric to be conveyed, the stability (grip) when conveying the nonwoven fabric increases.

On the other hand, the upper-surface-side warps includes the third warps (1S, 2S, 5S, 6S) that each pass above an upper-surface-side weft and then passes under the adjacent upper-surface-side weft and above the adjacent lower-surface-side weft. This prevents the upper-surface-side wefts (1'U, 3'U, 5'U, 7'U) from protruding from the front surface side on which the nonwoven fabric is conveyed and in turn suppresses, even when the wefts are the high-friction yarns, wear due to surface friction against a member such as a roll on the return side.

Further, in the multilayer fabric for nonwoven fabric 40, the number of upper-surface-side warps (6 warps) is larger than the number of lower-surface-side warps (2 warps) in a weave repeat. Accordingly, the structure of the side where the nonwoven fabric is conveyed (front surface side) becomes dense, which leads to an increase in fiber supportability, smoothness, and knuckle intersection supportability, whereas the structure of the back surface side that is the opposite side becomes sparse, which leads to an increase in air permeability.

Further, in the multilayer fabric for nonwoven fabric 40 according to the second embodiment, as shown in the schematic diagram of FIG. 6, the upper-surface-side wefts (1'U, 3'U, 5'U, 7'U) that are the high-friction yarns are woven in a manner as to prevent intersections with the upper-surface-side warps (1S, 2S, 5S, 6S) from protruding from the upper surface of the upper-surface-side warps.

As described above, the multilayer fabric for nonwoven fabric 40 includes the first binding yarn 3F and the second binding yarn 4F that form a pair. The first binding yarn 3F passes under at least two first lower-surface-side wefts 8'L, 2'L to form a first lower-surface-side intersection, and the second binding yarn 4F passes under at least two lower-surface-side wefts (4L', 6'L) to form a second lower-surface-side intersection. The first lower-surface-side intersection and the second lower-surface-side intersection are formed alternately in the conveyance direction of the nonwoven fabric.

As described above, on the back surface side of the lower-surface-side fabric of the multilayer fabric for nonwoven fabric 40, each binding yarn passes under at least two lower-surface-side wefts to form a corresponding lower-surface-side intersection. Therefore, each binding yarn tends to be exposed more on the back surface side of the lower-surface-side fabric, and an area rubbed (worn) against the machine or the roll increases accordingly. This allows an increase in wear resistance and in turn allows an increase in life when the multilayer fabric is used as a belt.

Note that, in the multilayer fabric for nonwoven fabric 40 according to the present embodiment, the upper-surface-side warp density of the upper-surface-side fabric preferably falls with a range of 50% to 90%, and the lower-surface-side warp density of the lower-surface-side fabric preferably falls within a range of 10% to 40%.

Grip Evaluation Result (1) In the weave repeat of the multilayer fabric for nonwoven fabric 30 according to the first embodiment, the grip force was 0.104 kgf when no high-friction yarn was used.

(2) In the weave repeat of the multilayer fabric for nonwoven fabric 30 according to the first embodiment, the grip force was 0.120 kgf when the high-friction yarns were used as some of the upper-surface-side warps.

(3) In the weave repeat of the multilayer fabric for nonwoven fabric 40 according to the second embodiment, the grip force was 0.086 kgf when no high-friction yarn was used.

(4) In the weave repeat of the multilayer fabric for nonwoven fabric 40 according to the second embodiment, the grip force was 0.108 kgf when the high-friction yarns were used as some of the upper-surface-side wefts.

The results of (1) to (4) described above show that the use of the high-friction yarns as at least some of the yarns forming the upper-surface-side fabric of the multilayer fabric for nonwoven fabric increases the web supportability.

Note that the yarns used as the warps or wefts according to each of the embodiments described above may be suitably selected in accordance with the intended use and the place of use. For example, the cross-sectional shape of the yarns is not limited to a circular shape, and yarns having a quadrangular shape, a star shape, or the like, or yarns having an elliptical shape, a hollow shape, a core-sheath structure, or the like may be used. Further, the material of the yarns may also be freely selected as long as desired characteristics are satisfied, and polyethylene terephthalate, polyester, polyamide, polyphenylene sulfide, polyvinylidene fluoride, polypropylene, aramid, polyetheretherketone, polyethylene naphthalate, polytetrafluoroethylene, cotton, wool, metal, thermoplastic polyurethane, thermoplastic elastomer, or the like may be used. Needless to say, a yarn may be used that is obtained by blending or including various substances in a copolymer or in these materials depending on the purpose. In general, it is preferable to use polyester monofilament that is high in rigidity and excellent in dimensional stability for the yarns forming the fabric for nonwoven fabric.

Although the present invention has been described with reference to each of the above-described embodiments, the present invention is not limited to any of the above-described embodiments, and a structure obtained by combining or replacing the structures of the embodiments as desired also falls within the scope of the present invention. Further, it is also possible to change the combination or the order of processing of each embodiment as desired based on the knowledge of those skilled in the art, or to apply modifications such as various design changes to the embodiments, and the embodiments to which such modifications are applied may also fall within the scope of the present invention.

INDUSTRIAL APPLICABILITY

The present invention is applicable to a multilayer fabric used for conveying a nonwoven fabric.

REFERENCE SIGNS LIST 10 nonwoven fabric manufacturing apparatus, 12 belt for nonwoven fabric, 14 drive roller, 18 web, 20 suction device, 22 nonwoven fabric, 30, 40 multilayer fabric for nonwoven fabric, 100 measuring instrument, 102 tensile tester, 104 measurement jig, 106 suction box, 110 nonwoven fabric, 120 measuring instrument, 122 friction coefficient measurement table, 124 yarn, 126 ceramic plate, 128 weight

The invention claimed is:

1. A multilayer fabric for nonwoven fabric, comprising:
an upper-surface-side fabric formed from upper-surface-side warps and upper-surface-side wefts; and
a lower-surface-side fabric formed from lower-surface-side warps and lower-surface-side wefts, the upper-surface-side fabric and the lower-surface-side fabric being bound together, wherein
first warps of the upper-surface-side warps serve as first binding yarns that bind the upper-surface-side fabric and the lower-surface-side fabric,
second warps of the lower-surface-side warps serve as second binding yarns that bind the upper-surface-side fabric and the lower-surface-side fabric, and
a high-friction yarn having a dynamic friction coefficient that ranges from 0.3 to 1.9 is used as at least some of the upper-surface-side warps and the upper-surface-side wefts.

2. The multilayer fabric for nonwoven fabric according to claim 1, wherein
the upper-surface-side warps include third warps that each pass above one of the upper-surface-side wefts and then passes below the adjacent upper-surface-side weft and above the adjacent lower-surface-side weft.

3. The multilayer fabric for nonwoven fabric according to claim 2, wherein
the upper-surface-side fabric is formed by a plain weave.

4. The multilayer fabric for nonwoven fabric according to claim 2, wherein
at least some of the third warps are the high-friction yarns.

5. The multilayer fabric for nonwoven fabric according to claim 1, wherein
the upper-surface-side warps are larger in number than the lower-surface-side warps in a weave repeat.

6. The multilayer fabric for nonwoven fabric according to claim 1, wherein
at least some of the upper-surface-side warps are the high-friction yarns.

7. The multilayer fabric for nonwoven fabric according to claim 6, wherein
an upper-surface-side warp density of the upper-surface-side fabric falls within a range of 70% to 99%, and
a lower-surface-side warp density of the lower-surface-side fabric falls within a range of 30% to 65%.

8. The multilayer fabric for nonwoven fabric according to claim 6, wherein
among the upper-surface-side warps, an upper-surface-side warp having one end and another end joined together to form a loop is not the high-friction yarn.

9. The multilayer fabric for nonwoven fabric according to claim 1, wherein
at least some of the upper-surface-side wefts are the high-friction yarns.

10. The multilayer fabric for nonwoven fabric according to claim 9, wherein
the upper-surface-side wefts that are the high-friction yarns are woven in a manner as to prevent intersections with the upper-surface-side warps from protruding from an upper surface of the upper-surface-side warps.

11. The multilayer fabric for nonwoven fabric according to claim 9, wherein
the first binding yarns and the second binding yarns form pairs,
the first binding yarns each pass under at least two first lower-surface-side wefts among the lower-surface-side wefts to form a first lower-surface-side intersection,
the second binding yarns each pass under at least two second lower-surface-side wefts different from the first lower-surface-side wefts among the lower-surface-side wefts to form a second lower-surface-side intersection, and
the first lower-surface-side intersection and the second lower-surface-side intersection are formed alternately in a conveyance direction of a nonwoven fabric.

12. The multilayer fabric for nonwoven fabric according to claim 9, wherein
an upper-surface-side warp density of the upper-surface-side fabric falls within a range of 50% to 90%, and a lower-surface-side warp density of the lower-surface-side fabric falls within a range of 10% to 40%.

* * * * *